United States Patent
Kras et al.

(10) Patent No.: US 11,457,041 B2
(45) Date of Patent: *Sep. 27, 2022

(54) SYSTEM AND METHODS FOR REVERSE VISHING AND POINT OF FAILURE REMEDIAL TRAINING

(71) Applicant: KnowBe4, Inc., Clearwater, FL (US)

(72) Inventors: Greg Kras, Dunedin, FL (US); Alin Irimie, Clearwater, FL (US)

(73) Assignee: KnowBe4, Inc., Clearwater, FL (US)

( * ) Notice: Subject to any disclaimer, the term of this patent is extended or adjusted under 35 U.S.C. 154(b) by 108 days.

This patent is subject to a terminal disclaimer.

(21) Appl. No.: 16/891,676

(22) Filed: Jun. 3, 2020

(65) Prior Publication Data

US 2020/0296133 A1    Sep. 17, 2020

Related U.S. Application Data

(63) Continuation of application No. 16/355,146, filed on Mar. 15, 2019, now Pat. No. 10,701,106, which is a
(Continued)

(51) Int. Cl.
*H04L 29/06* (2006.01)
*H04L 9/40* (2022.01)
(Continued)

(52) U.S. Cl.
CPC ...... *H04L 63/1483* (2013.01); *H04L 63/1433* (2013.01); *H04L 67/535* (2022.05); *H04W 4/12* (2013.01)

(58) Field of Classification Search
CPC . H04L 63/1483; H04L 63/1433; H04L 67/22; H04W 4/12
See application file for complete search history.

(56) References Cited

U.S. PATENT DOCUMENTS 7,599,992 B2    10/2009    Nakajima
8,041,769 B2    10/2011    Shraim et al.
(Continued)

FOREIGN PATENT DOCUMENTS

WO    WO-2016/164844 A1    10/2016

OTHER PUBLICATIONS

Ren et al. "A novel dynamic user authentication scheme", 2012 International Symposium on Communications and Information Technologies (ISCIT), Date of Conference: Oct. 2012.*
(Continued)

*Primary Examiner* — Morshed Mehedi
(74) *Attorney, Agent, or Firm* — Foley & Lardner LLP

(57) ABSTRACT

Embodiments of the disclosure describe a simulated phishing campaign manager that communicates a simulated phishing communication that includes at least the telephone number and reference identifier, to a device of a user. The content of the simulated phishing communication may prompt the user to call the telephone number identified in the simulated phishing communication. The security awareness system may select a telephone number and a reference identifier to use for the simulated phishing communication, the combination of which may be later used to identify a specific user if they respond to the message. Each of a plurality of users may have a unique combination of telephone number and reference identifier. The telephone number may be selected based on the geographic location of the user, or the telephone number may be selected to correspond to content in a simulated phishing communication.

20 Claims, 10 Drawing Sheets

Related U.S. Application Data continuation of application No. 15/926,470, filed on Mar. 20, 2018, now Pat. No. 10,237,302.

(51) Int. Cl.
*H04W 4/12* (2009.01)
*H04L 67/50* (2022.01)

(56) References Cited

U.S. PATENT DOCUMENTS

| | | | |
|---|---|---|---|
| 8,464,346 B2 | 6/2013 | Barai et al. | |
| 8,484,741 B1 | 7/2013 | Chapman | |
| 8,615,807 B1 | 12/2013 | Higbee et al. | |
| 8,635,703 B1 | 1/2014 | Belani et al. | |
| 8,719,940 B1 | 5/2014 | Higbee et al. | |
| 8,793,799 B2 | 7/2014 | Fritzson et al. | |
| 8,910,287 B1 | 12/2014 | Belani et al. | |
| 8,966,637 B2 | 2/2015 | Belani et al. | |
| 9,053,326 B2 | 6/2015 | Higbee et al. | |
| 9,246,936 B1 | 1/2016 | Belani et al. | |
| 9,253,207 B2 | 2/2016 | Higbee et al. | |
| 9,262,629 B2 | 2/2016 | Belani et al. | |
| 9,325,730 B2 | 4/2016 | Higbee et al. | |
| 9,356,948 B2 | 5/2016 | Higbee et al. | |
| 9,373,267 B2 | 6/2016 | Sadeh-Koniecpol et al. | |
| 9,398,029 B2 | 7/2016 | Sadeh-Koniecpol et al. | |
| 9,398,038 B2 | 7/2016 | Higbee et al. | |
| 9,558,677 B2 | 1/2017 | Sadeh-Koniecpol et al. | |
| 9,591,017 B1 | 3/2017 | Higbee et al. | |
| 9,635,052 B2 | 4/2017 | Hadnagy | |
| 9,667,645 B1 | 5/2017 | Belani et al. | |
| 9,674,221 B1 | 6/2017 | Higbee et al. | |
| 9,729,573 B2 | 8/2017 | Gatti | |
| 9,813,454 B2 | 11/2017 | Sadeh-Koniecpol et al. | |
| 9,824,609 B2* | 11/2017 | Sadeh-Koniecpol | G06F 21/563 |
| 9,870,715 B2 | 1/2018 | Sadeh-Koniecpol et al. | |
| 9,876,753 B1 | 1/2018 | Hawthorn | |
| 9,894,092 B2 | 2/2018 | Irimie et al. | |
| 9,912,687 B1 | 3/2018 | Wescoe et al. | |
| 9,942,249 B2 | 4/2018 | Gatti | |
| 9,998,480 B1 | 6/2018 | Gates et al. | |
| 10,243,904 B1 | 3/2019 | Wescoe et al. | |
| 10,904,186 B1 | 1/2021 | Everton et al. | |
| 10,986,122 B2 | 4/2021 | Bloxham et al. | |
| 11,044,267 B2 | 6/2021 | Jakobsson et al. | |
| 2007/0110282 A1* | 5/2007 | Millsapp | G06Q 20/4012 382/115 |
| 2007/0142030 A1 | 6/2007 | Sinha et al. | |
| 2008/0046738 A1 | 2/2008 | Galloway et al. | |
| 2009/0216795 A1 | 8/2009 | Cohen et al. | |
| 2010/0211641 A1 | 8/2010 | Yih et al. | |
| 2010/0269175 A1 | 10/2010 | Stolfo et al. | |
| 2012/0124671 A1 | 5/2012 | Fritzson et al. | |
| 2012/0258437 A1 | 10/2012 | Sadeh-Koniecpol et al. | |
| 2013/0198846 A1 | 8/2013 | Chapman | |
| 2013/0203023 A1 | 8/2013 | Sadeh-Koniecpol et al. | |
| 2013/0219495 A1 | 8/2013 | Kulaga et al. | |
| 2013/0297375 A1 | 11/2013 | Chapman | |
| 2014/0173726 A1 | 6/2014 | Varenhorst | |
| 2014/0199663 A1* | 7/2014 | Sadeh-Koniecpol | H04L 63/145 434/118 |
| 2014/0199664 A1* | 7/2014 | Sadeh-Koniecpol | G06F 21/563 434/118 |
| 2014/0201835 A1 | 7/2014 | Emigh et al. | |
| 2014/0230060 A1 | 8/2014 | Higbee et al. | |
| 2014/0230061 A1 | 8/2014 | Higbee et al. | |
| 2014/0230065 A1 | 8/2014 | Belani et al. | |
| 2014/0331119 A1* | 11/2014 | Dixon | H04L 63/168 715/234 |
| 2015/0163242 A1 | 6/2015 | Laidlaw et al. | |
| 2015/0180896 A1 | 6/2015 | Higbee et al. | |
| 2015/0229664 A1 | 8/2015 | Hawthorn et al. | |
| 2016/0036829 A1 | 2/2016 | Sadeh-Koniecpol et al. | |
| 2016/0142439 A1 | 5/2016 | Goutal | |
| 2016/0164898 A1 | 6/2016 | Belani et al. | |
| 2016/0173510 A1 | 6/2016 | Harris et al. | |
| 2016/0234245 A1 | 8/2016 | Chapman | |
| 2016/0261618 A1 | 9/2016 | Koshelev | |
| 2016/0301705 A1 | 10/2016 | Higbee et al. | |
| 2016/0301716 A1 | 10/2016 | Sadeh-Koniecpol et al. | |
| 2016/0308897 A1 | 10/2016 | Chapman | |
| 2016/0330238 A1 | 11/2016 | Hadnagy | |
| 2017/0026410 A1 | 1/2017 | Gatti | |
| 2017/0078322 A1 | 3/2017 | Seiver et al. | |
| 2017/0103674 A1 | 4/2017 | Sadeh-Koniecpol et al. | |
| 2017/0104778 A1 | 4/2017 | Shabtai et al. | |
| 2017/0140663 A1 | 5/2017 | Sadeh-Koniecpol et al. | |
| 2017/0237776 A1 | 8/2017 | Higbee et al. | |
| 2017/0244746 A1 | 8/2017 | Hawthorn et al. | |
| 2017/0251009 A1 | 8/2017 | Irimie et al. | |
| 2017/0251010 A1 | 8/2017 | Irimie et al. | |
| 2017/0257363 A1 | 9/2017 | Franke et al. | |
| 2017/0257391 A9 | 9/2017 | Emigh et al. | |
| 2017/0318046 A1 | 11/2017 | Weidman | |
| 2017/0331848 A1 | 11/2017 | Alsaleh et al. | |
| 2018/0020092 A1* | 1/2018 | Bender | H04L 63/1408 |
| 2018/0041537 A1 | 2/2018 | Bloxham et al. | |
| 2018/0103052 A1 | 4/2018 | Choudhury et al. | |
| 2019/0173819 A1 | 6/2019 | Wescoe et al. | |
| 2019/0215335 A1 | 7/2019 | Benishti | |
| 2019/0245885 A1 | 8/2019 | Starink et al. | |
| 2019/0245894 A1 | 8/2019 | Epple et al. | |
| 2021/0075827 A1 | 3/2021 | Grealish | |
| 2021/0185075 A1 | 6/2021 | Adams | |
| 2021/0194924 A1 | 6/2021 | Heinemeyer et al. | |

OTHER PUBLICATIONS

Abu-Nimeh et al., "A Comparison of Machine Learning Techniques for Phishing Detection," eCrime '07: Proceedings of the anti-phishing working groups 2nd annual eCrime researchers summit, 2007, pp. 60-69, ACM Digital Library.

Cao et al., "Anti-phishing based on automated individual white-list", Proceedings of the 4th ACM workshop on Digital identity management, Oct. 2008.

Final Office Action on U.S. Appl. No. 16/355,146 dated Feb. 26, 2020.

Non-Final Office Action for U.S. Appl. No. 15/926,470, dated May 31, 2018.

Non-Final Office Action on U.S. Appl. No. 16/355,146 dated Oct. 18, 2019.

Notice of Allowance for U.S. Appl. No. 15/926,470, dated Nov. 2, 2018.

Notice of Allowance on U.S. Appl. No. 16/355,146 dated May 6, 2020.

Palka et al., "Dynamic phishing content using generative grammars," Software Testing, Verification and Validation Workshops (ICSTW), 2015 IEEE Eighth International Conference, Date of Conference: Apr. 13-17, 2015,IEEE Xplore, pp. 1-8.

* cited by examiner

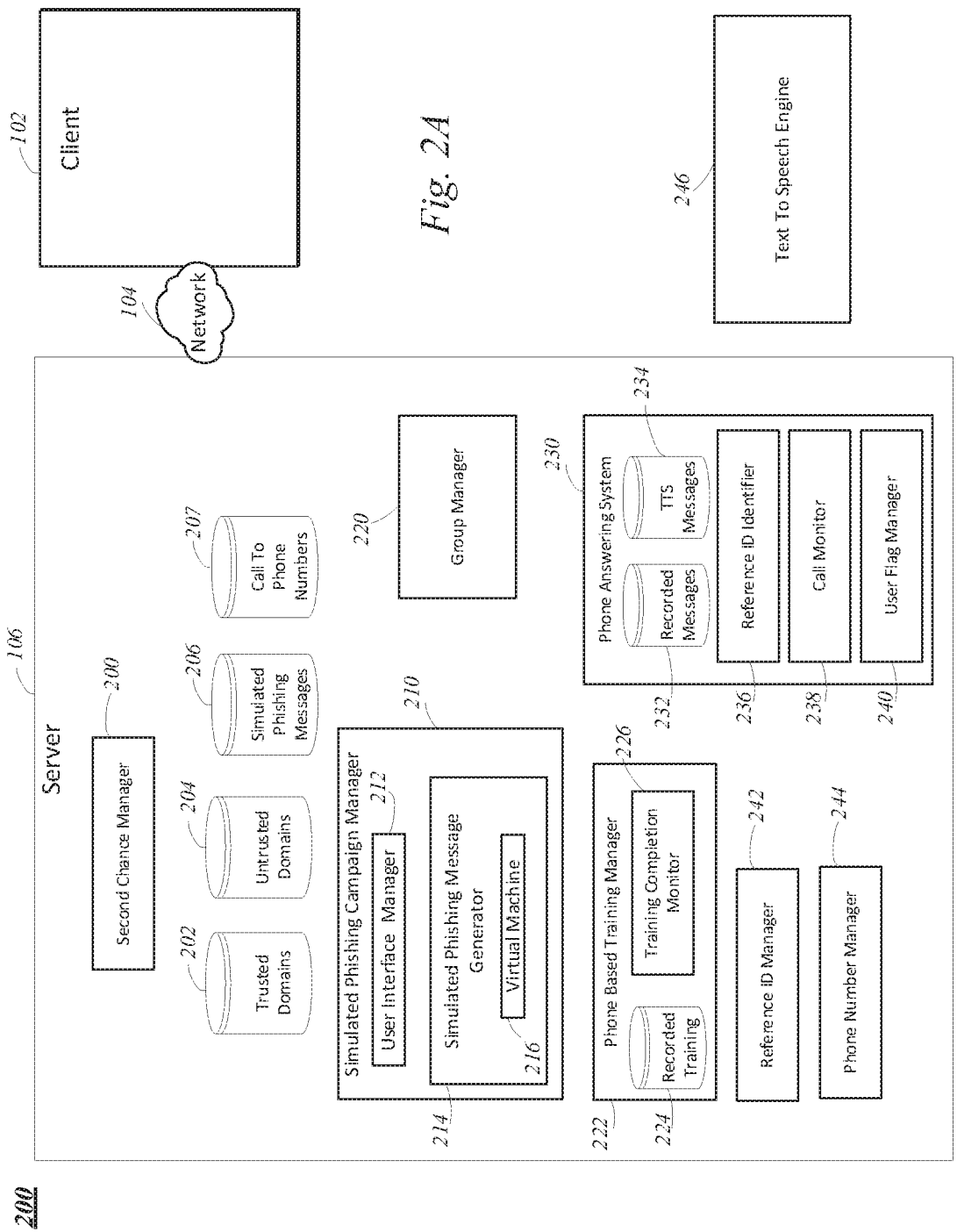

SYSTEM AND METHODS FOR REVERSE VISHING AND POINT OF FAILURE REMEDIAL TRAINING

CROSS-REFERENCE TO THE RELATED APPLICATION

This patent application is a continuation of, and claims priority to and the benefit of U.S. patent application Ser. No. 16/355,146, titled "SYSTEM AND METHODS FOR REVERSE VISHING AND POINT OF FAILURE REMEDIAL TRAINING," and filed Mar. 15, 2019, and is a continuation of, and claims priority to and the benefit of U.S. patent application Ser. No. 15/926,470, titled "SYSTEM AND METHODS FOR REVERSE VISHING AND POINT OF FAILURE REMEDIAL TRAINING," and filed Mar. 20, 2018, the contents of which are incorporated herein by reference in its entirety.

This disclosure generally relates to security awareness systems for performing simulated phishing attacks.

BACKGROUND OF THE DISCLOSURE

It can be useful to perform simulated phishing attacks on an individual or set of individuals for the purposes of extracting information from a device used by the individuals. A phishing attack involves an attempt to acquire sensitive information such as usernames, passwords, credit card details, etc., often for malicious reasons, possibly by masquerading as a trustworthy entity. For example, a message may be sent to a target, the message having an attachment that performs malicious actions when executed or a link to a webpage that either performs malicious actions when accessed or prompts the user to execute a malicious program. Malicious actions may include malicious data collection or actions harmful to the normal functioning of a device on which the message was activated, or any other malicious actions capable of being performed by a program or a set of programs.

BRIEF SUMMARY OF THE DISCLOSURE

A simulated phishing attack may test the readiness of a security system or users of a system to handle phishing attacks such that malicious actions are prevented. A simulated phishing attack may, for example, target many users, such as employees of an organization. Such an attack may be performed by a party friendly or neutral to the targets of the simulated attack. In one type of simulated phishing attack, an attempt is made to lure a user (e.g., an employee of a business entity) into performing a target action. Performing a simulated phishing attack can help expose individuals that are more susceptible to phishing attacks, in addition to exposing weaknesses in the security infrastructure meant to protect users and/or devices from phishing attacks or other computerized, cyber, or digital attacks.

Different users respond differently to different stimuli, and therefore the type of phishing attack that one user falls prey to may not be remotely tempting to a different user. The same user may also respond differently to a phishing attack depending on where the user is, who the user is with, what the user is doing, etc. These differences in user behaviors mean that the same simulated phishing attack does not have the same effectiveness in terms of teaching a user how to recognize threats, because not all users would have likely responded to a similar real phishing email in the first place.

Phishing attacks are rapidly getting more and more sophisticated, and the instigators of the phishing attacks have been able to mass scale spear phishing, which is individualized, real time, and reactive. For a security awareness system to be able to train users to detect such highly sophisticated and personalized attacks, the security awareness system needs to create a simulated phishing environment that is as sophisticated and individualized and synonymous with the kinds of attacks a user is likely to encounter in the real world.

Vishing (voice or Voice Over Internet Protocol (VoIP) phishing) is a type of phishing attack that is carried out using voice technology. In one example of a vishing attack, the potential victim receives a voice message, in some cases generated by speech synthesis, indicating that suspicious activity has taken place in a credit card account, a bank account, a mortgage account, or another financial service in their name. The victim is told to call a specific telephone number and provide information to "verify identify" or to "ensure that fraud does not occur". If the attack is carried out by telephone, caller ID spoofing may be used to try and fool the user into believing that the call is originating from a legitimate source.

Reverse vishing is a technique where a message (examples of a message include an email message, a text message, an SMS message, a message using a social network platform, and a VoIP call) is sent to a user requiring that the user phones a number. The attacker positions themselves to help the user solve a problem, for example preventing fraud on a user's account. The attacker may use search engine optimization poisoning techniques to position the fake phone numbers associated to legitimate organizations on top of search engines. The number may be a premium charge number, the calling of which may cost the user money. In some examples, upon calling the phone number, the user may be asked to enter personal information into the phone, such as pin numbers, account numbers, or other identification numbers.

A security awareness system can be configured to send and simulate voice calls (e.g. via landline, cellular telephone, or VoIP) to users as part of a simulated phishing campaign. A security awareness system can also be configured to receive voice calls (e.g. via landline, cellular telephone, or VoIP) from users in response to a simulated phishing message, as part of a simulated phishing campaign.

In some examples, the simulated phishing campaign manager may communicate a simulated phishing communication, that includes at least the telephone number and reference identifier, to a device of a user. The content of the simulated phishing communication may prompt the user to call the telephone number identified in the simulated phishing communication.

In some implementations, the security awareness system may select a telephone number and a reference identifier to use for the simulated phishing communication, the combination of which may be later used to identify a specific user if they respond to the message. Each of a plurality of users may have a unique combination of telephone number and reference identifier. The telephone number may be selected based on the geographic location of the user, or the telephone number may be selected to correspond to content in a simulated phishing communication.

In some examples, the simulated phishing campaign manager may receive information indicating that the user called the telephone number from the simulated phishing communication. The server may receive a telephone call from the user to the telephone number provided. In some examples, the server may play a predetermined message instructing the user to enter the reference identifier. In response to the predetermined message, the user may provide the reference identifier on the call. In some embodiments, the server may receive information which identifies the user, or the server may receive information which identifies the location from which the user called the provided telephone number. The server may receive information about, or may calculate, how long the user stays on the phone.

Responsive to the call and the provision of the reference identifier, the simulated phishing campaign manager may determine that the user failed the simulated phishing attack. If the user fails the simulated phishing attack, the user may receive remedial training on the phone. The server may be able to identify whether the user completes the remedial training on the phone.

In some embodiments, the server may communicate a message to a device of the user indicating that the user has failed a simulated phishing attack. Responsive to this indication, the device may lock one or more functions on the device until the user completes remedial training.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 2A depicts an implementation of some of the server architecture of an implementation of a system capable of performing simulated phishing attacks using reverse vishing techniques;

DETAILED DESCRIPTION

For purposes of reading the description of the various embodiments below, the following descriptions of the sections of the specifications and their respective contents may be helpful:

Section A describes a network environment and computing environment which may be useful for practicing embodiments described herein.

Section B describes embodiments of systems and methods for creating and executing simulated phishing campaigns by a security awareness system, wherein the simulated phishing campaigns utilize simulated reverse phishing attacks.

A. Computing and Network Environment

Figure 1A:
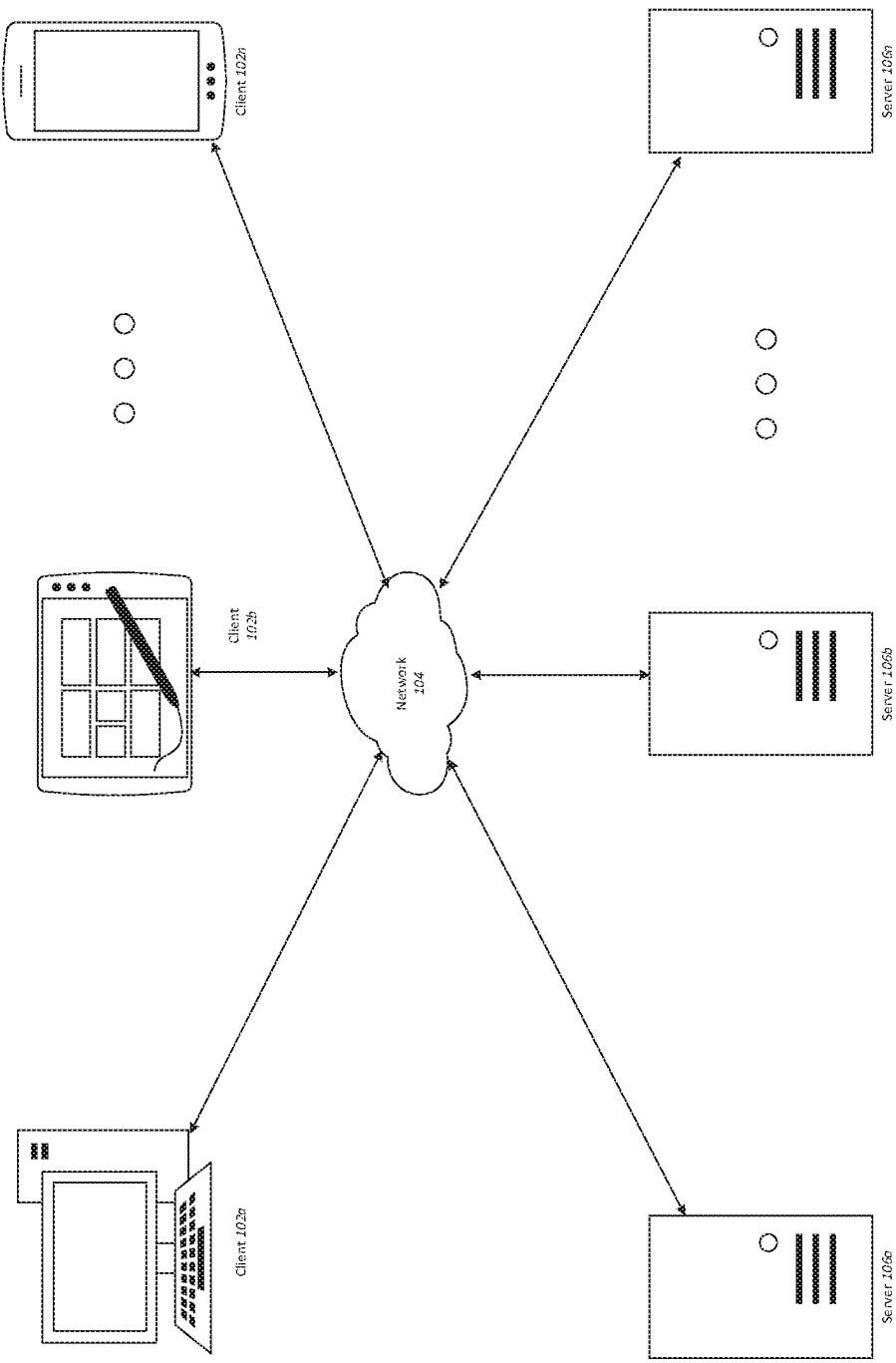
FIG. 1A is a block diagram depicting an embodiment of a network environment comprising client device in communication with server device.

Prior to discussing specific embodiments of the present solution, it may be helpful to describe aspects of the operating environment as well as associated system components (e.g. hardware elements) in connection with the methods and systems described herein. Referring to FIG. 1A, an embodiment of a network environment is depicted. In a brief overview, the network environment includes one or more clients 102a-102n (also generally referred to as local machines(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node(s) 106, machine(s) 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' may be a public network. In still another of these embodiments, networks 104 and 104' may both be private networks.

The network 104 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel or a satellite band. The wireless links may also include any cellular network standards to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommuniations-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1xRTT, CDMA-EVDO, LTE, LTE- Advanced, LTE-M1, and Narrowband IoT (NB-IoT). Wireless standards may use various channel access methods, e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv6), or the link layer. The network 104 may be a type of broadcast network, a telecommunications network, a data communication network, or a computer network.

In some embodiments, the system may include multiple, logically-grouped servers 106. In one of these embodiments, the logical group of servers may be referred to as a server farm or a machine farm. In another of these embodiments, the servers 106 may be geographically dispersed. In other embodiments, a machine farm may be administered as a single entity. In still other embodiments, the machine farm includes a plurality of machine farms. The servers 106 within each machine farm can be heterogeneous—one or more of the servers 106 or machines 106 can operate according to one type of operating system platform (e.g., Windows, manufactured by Microsoft Corp. of Redmond, Wash.), while one or more of the other servers 106 can operate according to another type of operating system platform (e.g., Unix, Linux, or Mac OSX).

In one embodiment, servers 106 in the machine farm may be stored in high-density rack systems, along with associated storage systems, and located in an enterprise data center. In this embodiment, consolidating the servers 106 in this way may improve system manageability, data security, the physical security of the system, and system performance by locating servers 106 and high-performance storage systems on localized high-performance networks. Centralizing the servers 106 and storage systems and coupling them with advanced system management tools allows more efficient use of server resources.

The servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm can be increased if the servers 106 are connected using a local-area network (LAN) connection or some form of direct connection. Additionally, a heterogeneous machine farm may include one or more servers 106 operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc. of Fort Lauderdale, Fla.; the HYPER-V hypervisors provided by Microsoft, or others. Hosted hypervisors may run within an operating system on a second software level. Examples of hosted hypervisors may include VMWare Workstation and VirtualBox, manufactured by Oracle Corporation of Redwood City, Calif.

Management of the machine farm may be de-centralized. For example, one or more servers 106 may comprise components, subsystems and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, a plurality of servers 106 may be in the path between any two communicating servers 106.

Figure 1B:
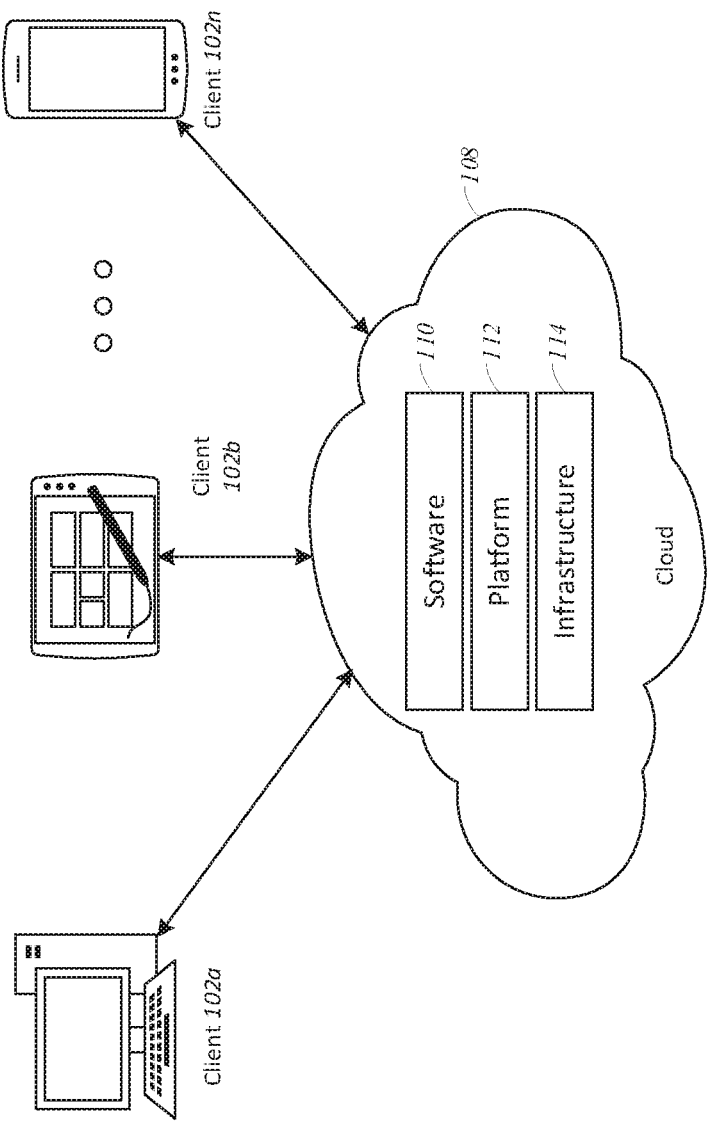
FIG. 1B is a block diagram depicting a could computing environment comprising client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or zero client may depend on the connection to the cloud 108 or server 106 to provide functionality. A zero client may depend on the cloud 108 or other networks 104 or servers 106 to retrieve operating system data for the client device 102. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 109 may include both the private and public networks 104 and servers 106.

The cloud 108 may also include a cloud-based delivery, e.g. Software as a Service (SaaS) 110, Platform as a Service (PaaS) 112, and Infrastructure as a Service (IaaS) 114. IaaS may refer to a user renting the user of infrastructure resources that are needed during a specified time period. IaaS provides may offer storage, networking, servers or virtualization resources from large pools, allowing the users to quickly scale up by accessing more resources as needed. Examples of IaaS include Amazon Web Services (AWS) provided by Amazon, Inc. of Seattle, Wash., Rackspace Cloud provided by Rackspace Inc. of San Antonio, Tex., Google Compute Engine provided by Google Inc. of Mountain View, Calif., or RightScale provided by RightScale, Inc. of Santa Barbara, Calif. PaaS providers may offer functionality provided by IaaS, including, e.g., storage, networking, servers or virtualization, as well as additional resources, e.g., the operating system, middleware, or runtime resources. Examples of PaaS include Windows Azure provided by Microsoft Corporation of Redmond, Wash., Google App Engine provided by Google Inc., and Heroku provided by Heroku, Inc. of San Francisco Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, Calif., or Office365 provided by Microsoft Corporation. Examples of SaaS may also include storage providers, e.g. Dropbox provided by Dropbox Inc. of San Francisco, Calif., Microsoft OneDrive provided by Microsoft Corporation, Google Drive provided by Google Inc., or Apple iCloud provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. Google Chrome, Microsoft Internet Explorer, or Mozilla Firefox provided by Mozilla Foundation of Mountain View, Calif.). Clients 102 may also access SaaS resources through smartphone or tablet applications, including e.g., Salesforce Sales Cloud, or Google Drive App. Clients 102 may also access SaaS resources through the client operating system, including e g Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

The client 102 and server 106 may be deployed as and/or executed on any type and form of computing device, e.g., a computer, network device or appliance capable of communicating on any type and form of network and performing the operations described herein.

Figure 1C:
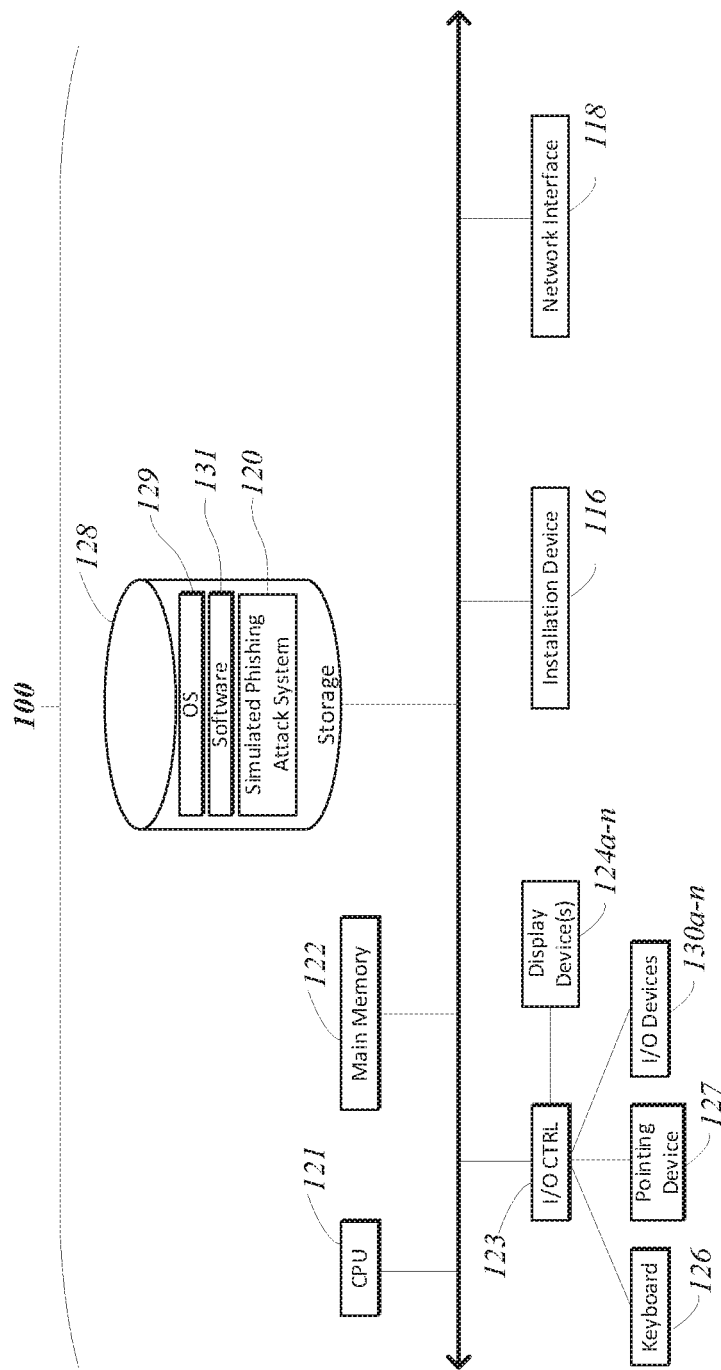
FIGS. 1C and 1D are block diagrams depicting embodiments of computing devices useful in connection with the methods and systems described herein.
Figure 1D:
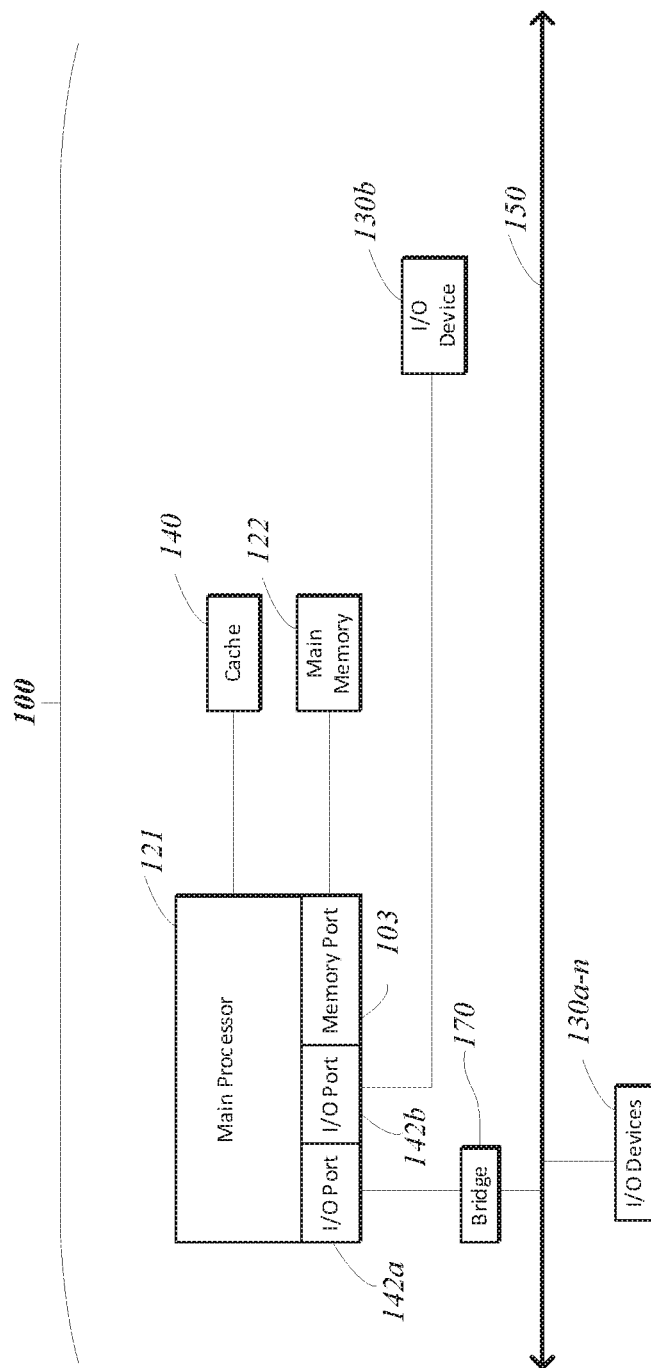

FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, and I/O controller 123, display devices 124a-124n, a keyboard 126 and a pointing device 127, e.g., a mouse. The storage device 128 may include, without limitation, an operating system 129, software 131, and a software of a simulated phishing attack system 120. As shown in FIG. 1D, each computing device 100 may also include additional optional elements, e.g., a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTER CORE i5 and INTEL CORE i7.

Main memory unit 122 may include on or more memory chips capable of storing data and allowing any storage location to be directly accessed by the microprocessor 121. Main memory unit 122 may be volatile and faster than storage 128 memory. Main memory units 122 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts and embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphic Port (AGP) to communicate with the display 124 or the I/O controller 123 for the display 124. FIG. 1D depicts and embodiment of a computer 100 in which the main processor 121 communicates directly with I/O device 130b or other processors 121' via HYPER-TRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple iPhone. Some devices 130a-130n allow gesture recognition inputs through combining some of the inputs and outputs. Some devices 130a-130n provide for facial recognition which may be utilized as an input for different purposes including authentication and other commands. Some devices 130a-130n provide for voice recognition and inputs, including, e.g., Microsoft KINECT, SIRI for iPhone by Apple, Google Now or Google Voice Search, and Alexa by Amazon.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augmented reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, a I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or auto stereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116 and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, WINDOWS 8 and WINDOW 10, all of which are manufactured by Microsoft Corporation of Redmond, Wash.; MAC OS and iOS, manufactured by Apple, Inc.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, or a NINTENDO DS, NINTENDO 3DS, NINTENDO WII, or a NINTENDO WII U device manufactured by Nintendo Co., Ltd., of Kyoto, Japan, or an XBOX 360 device manufactured by Microsoft Corporation.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/ AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the iPhone family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Security Awareness Systems and Methods

The following describes systems and methods of creating, controlling and executing simulated phishing campaigns using reverse vishing techniques.

A system can be configured to send simulated phishing emails, text messages, phone calls (e.g. via VoIP) and Internet based communications, all which may be referred to as 'messages'. The system may vary the quantity, frequency, type, sophistication, content, timing, and combination of messages. A set of phishing emails, text messages, and/or phone calls may be referred to as a simulated phishing campaign. In some implementations, some or all messages (email, text messages, VoIP calls, Internet based communications) in a simulated phishing campaign may be used to direct the user to open a previous or subsequent simulated phishing message. In some implementations, simulated phishing messages of a campaign may be intended to lure the user to perform a different requested action, such as selecting a hyperlink in an email or text message, or returning a voice call. In some implementations, simulated phishing messages of a campaign may be intended to lure the user to provide personal information such as user names, passwords, identification numbers, account numbers, and the like. The desired user response is referred to as the 'action', or the 'requested action', or the 'desired action'.

In some implementations, the system may adaptively learn the best method (e.g., set of steps) and/or the best combination of messages to get the user to perform the requested action, such as interacting with a hyperlink or opening a file. The learning process implemented by the system can be trained by observing the behavior of other users in the same company or in the same industry, by observing the behavior of all other users of the system, or by observing the behavior of a subset of other users in the system based on one or more attributes of the subset of other users meeting one or more selected criteria.

The system can record when and how the requested action was performed and can produce reports about the requested actions. The reports can track the number of users the simulated phishing messages were sent to, whether messages were successfully delivered, whether a user performed a requested action, when a requested action was performed, and a combination and timing of messages that induced a user to perform a requested action.

In some implementations, the system may provide training on why a user should not have performed a requested action at the time that the user performs the requested action. In some implementations, the system may add users that performed requested actions to specific user groups that are scheduled to receive general or targeted remedial training at some time in the future. In some implementations, the system may assign a user attribute to a user that performed the requested action, and the user attributes may be used to create query-based groups for future training or simulated phishing campaigns.

A security awareness system may keep logs from previous simulated phishing campaigns, including all actions performed on a user and all user actions performed. A security awareness system may further use information from event logs, for example Windows event logs, as well as learning management system (LMS) analysis, which may inform the security awareness system what training a user has had, where the user performed well and where the user struggled with the training that the user completed, and what the user should know. A security awareness system may use information from company profiling activities, for example email exposure check results, applications used, software as a service (SaaS) services used, etc. A security awareness system may use information from industry profiles corresponding to an industry that a user's company is associated with.

In some embodiments, a security awareness system is capable of performing risk analysis of users, groups of users, or a company. For example, a security awareness system may be able to perform a risk profile of a user with respect to wire transfer fraud, or IP theft, or vishing, or reverse vishing attacks. In some embodiments, a security awareness system can track events in a company and/or for a user in a company to identify one or more risk points, for example, in some embodiments, a system can track information that a given user is exposed to, in order to identify a risk point. For example, employees in a company that regularly deal with wire transfers may be likely to be at a higher risk for wire transfer fraud, and people that are exposed to sensitive information may be at a higher risk for leaking intellectual property.

In some embodiments, a security awareness system campaign duration is limited to a fixed period of time, for example a fixed number of days. In some embodiments, a security awareness campaign will terminate once a certain percentage of users fail the campaign, for example in a fixed period of time. In some embodiments, a security awareness campaign stops for a specific user once that user fails a simulated phishing test as part of the campaign.

Referring to FIG. 2A in a general overview, FIG. 2A depicts some of the server architecture of an implementation of a system 200 capable of creating, controlling and executing simulated phishing campaigns using reverse vishing techniques. In some implementations, the system 200 includes a server 106 and a client 102 and a network 104 allowing communication between these system components. The server 106 may include a simulated phishing campaign manager 210, a trusted domains storage 202, an untrusted domains storage 204, and a simulated phishing emails storage 206. The simulated phishing campaign manager 210 may include a user interface manager 212, and a simulated phishing message generator 214, which may include a virtual machine 216. In some implementations, the system may include a phone answering system 230. The phone answering system 230 may include a reference ID identifier 236, a call monitor 238, and a user flag manager 240. The phone answering system 230 may include a storage for recorded messages 232 and a storage for text to speech (TTS) messages 234.

In some implementations, the system 200 includes a group manager 220, used to manage user groups for users for simulated phishing campaigns. User groups may be static or dynamic and may involve setting or reading user attributes and creating and running queries. System 200 may also include phone-based training manager 222.

Phone-based training manager may include a training completion monitor 226 and a storage for recorded training 224. In some embodiments, system 200 includes a reference ID manager 242 and a phone number manager 244. In some embodiments, a text to speech engine 246 is included in order to generate the voice messages from text strings. The text to speech engine 246 may be integrated in the system 200, or the text to speech engine 246 may be a cloud-based service that is accessed via an application programming interface (API).

Referring again to FIG. 2A in more detail, second chance manager 200 generally manages the process of sending/receiving data and information between the client 102 and the server 106. For example, the client 102 sends the URL clicked on by the user to server 106 for trusted/untrusted/unknown determination with the results returned to the client 102.

The server 106 may include a storage for trusted domains 202 (i.e., websites having domains that are known to be safe—not phishing) and untrusted domains 204 (i.e., websites having domains that are known to be phishing). The domains can be viewed by a phishing campaign administrator by way of a web console into the simulated phishing campaign manager 210. The simulated phishing campaign manager 210 includes a simulated phishing message generator 214, which may be implemented as or contain a virtual machine 216. The simulated campaign manager 210 also includes a user interface manager 212. Responsive to a user input, the simulated phishing campaign manager 210 generates a campaign for a simulated phishing attack, including one or more selected phishing message templates which may be stored in simulated phishing messages storage 206, one or more selected landing page templates, and one or more selected targeted user groups, in addition to other user input.

The simulated phishing campaign manager 210 may manage various aspects of a simulated phishing attack campaign. For example, the simulated phishing campaign manager 210 may process input from the server 106 and/or may provide access as needed to various applications, modules, and other software components of server 106 to other various applications, modules, and other software components of server 106. The simulated phishing campaign manager 210 may monitor and control timing of various aspects of a simulated phishing attack campaign, may process requests for access to simulated attack campaign results, and/or may perform other tasks related to the management of a simulated phishing attack campaign.

In some embodiments, the simulated phishing campaign manager 210 may be integrated with or coupled to memory 122. In some embodiments, the memory may include any type and form of storage, such as a database or file system. The memory 122 may store data such as parameters and scripts corresponding to the choices made by a server 106 through a simulated phishing campaign manager 210, e.g. as described above for a particular simulated phishing attack.

In an implementation, the simulated phishing campaign manager 210 includes a simulated phishing message generator 214. The simulated phishing message generator 214 may be integrated with or coupled to the memory 122, so as to provide the simulated phishing message generator 214 access to parameters associated with messaging choices made for a particular simulated campaign by e.g. the server 106. The simulated phishing message generator 214 may be integrated with or coupled to memory or a memory store or otherwise a storage, such as a database, containing simulated phishing messages 206. The simulated phishing message generator 214 may be an application, service, daemon, routine, or other executable logic for generating messages. The messages generated by the simulated phishing message generator 214 may be of any appropriate format. For example, they may be email messages, text or SMS messages, messages used by particular messaging applications such as, e.g. WhatsApp™ (Facebook, Menlo Park, Calif.), or any other type of message. Message types to be used in a particular attack may be selected by e.g. a server 106 using a simulated phishing campaign manager 210. The messages may be generated in any appropriate manner, e.g. by running an instance of an application that generates the desired message type, such as running e.g. a Gmail™ application (Google, Mountain View, Calif.), Microsoft Outlook™ (Microsoft, Redmond, Wash.), a text messaging application, or any other appropriate application. The messages may be generated by running a messaging application on e.g. a virtual machine 216 or may simply be run on an operating system of the server 106 or may be run in any other appropriate environment. The messages may be generated to be formatted consistent with specific messaging platforms, for example Outlook 365 (Microsoft, Redmond, Wash.), Outlook Web Access (OWA) (Microsoft, Redmond, Wash.), Webmail, iOS (Apple, Cupertino, Calif.), Gmail client (Google, Mountain View, Calif.), and so on.

In some embodiments, the simulated phishing message generator 214 can be configured to generate messages having the ability to traverse users who interact with the messages to a specific landing page.

In some embodiments, the simulated phishing message generator 214 can be configured to generate a simulated phishing email. The email can appear to be delivered from a trusted email address, such as the email address of an executive of the company at which the targeted user is employed. In addition, the email can have a "Subject:" field that is intended to cause the user to take an action, such as initiating a wire transfer. In some embodiments, the simulated phishing message generator 214 can generate one or more simulated phishing emails which are stored in the simulated phishing messages storage 206. In some embodiments, the simulated phishing message generator 214 can generate multiple instances of the email which may be delivered to multiple users, such as a subset of all of the employees of the company. In some embodiments, the simulated phishing message generator 214 can generate multiple instances of the email which may be delivered to a user group. For example, the server 106 can select any number of employees who should be targeted by a simulated attack, can create a user group and store this user group in the memory 122. The simulated phishing message generator 214 can retrieve this information from the memory 122 and can generate a set of emails similar to the email, each addressed to a respective target identified in the information stored in the memory 122. That is, the simulated phishing message generator 214 can generate the emails such that the "From:" and "Subject:" fields of each email are identical, while the "To:" field is adjusted according to the desired targets.

In an implementation, a simulated phishing campaign manager 210 may be e.g., another name for a system administrator, such as a security manager, a third-party security consultant, a risk assessor, or any other party that uses the simulated phishing campaign manager 210 installed on a server. The server 106 may wish to direct a simulated phishing attack by interacting with the simulated phishing campaign manager 210 installed on the server. The simulated phishing campaign manager 210 may be, for example, a desktop computer, a laptop computer, a mobile device, or any other suitable computing device. The simulated phishing campaign manager 210 may be e.g., an application on a device that allows for a user of the device to interact with the server 106 for e.g. purposes of creating, configuring, tailoring and/or executing a simulated phishing attack and/or viewing and/or processing and/or analyzing the results of a phishing attack.

In an implementation, the simulated phishing campaign manager 210, when executed, causes a graphical user interface to be displayed to the server 106. In other embodiments, the simulated phishing campaign manager 210 allows for user input through a non-graphical user interface, such as a user interface that accepts text or vocal input without displaying an interactive image. A graphical user interface may be displayed on a screen of a mobile phone, or a monitor connected to a desktop or laptop computer or may be displayed on any other display. The user may interact with e.g. the graphical user interface on the device by typing, clicking a mouse, tapping, speaking, or any other method of interacting with a user interface. The graphical user interface on the device may be a web-based user interface provided by a web browser (e.g. Google Chrome (Google, Mountain View, Calif.), Microsoft Internet Explorer (Microsoft, Redmond, Wash.), or Mozilla Firefox (Mozilla Foundation of Mountain View, Calif.), or may be an application installed on a user device capable of opening a network connection to simulated phishing campaign manager 210 or may be any other type of interface.

In an implementation, the simulated phishing campaign manager 210 and/or server 106 may make choices concerning how a simulated phishing attack is to be carried out. For example, a graphical user interface run by the simulated phishing campaign manager 210 may be displayed to the server 106. An administrator, via the server 106, may input parameters for the attack that affect how it will be carried out. For example, via the server 106 an administrator may make choices as to which users to include as potential targets in the attack, the method of determining which users are to be selected as targets of the attack, the timing of various aspects of the attack, whether to use an attack template that includes values for one or a plurality of failure indicators, how responses from targeted users should be uniquely identified, and other choices. These choices may be made by selecting options displayed on a graphical user interface from dropdown menus, being presented with choices through a simulated attack wizard, or in any other appropriate manner.

In an implementation, the simulated phishing campaign manager 210 may allow the server 106, such as via application programming interfaces (APIs), to access and/or change settings of an account maintained with any party involved with the attack, such as, for example, a third party security service provider, or may allow the server 106 to access and/or change settings of an account maintained with a third party security service provider, such as one that e.g. manages an exploit server, view bills and/or make payments to a third party security service provider, to perform these functions with other third parties involved in the attack, or provide any other functions that would be appropriate for facilitating communications between the server 106 and any other parties involved in the attack.

The server 106 may include phone answering system 230. The phone answering system 230 may process input from the server 106 and/or may provide access as needed to various applications, modules, and other software components of server 106 to other various applications, modules, and other software components of server 106. The phone answering system 230 may monitor and control timing of various aspects of phone call received by a user of the system in response to a simulated reverse vishing attack and may process requests for access to results and user actions associated with simulated reverse vishing attacks, and/or may perform other tasks related to the management of phone calls related to a reverse vishing simulated phishing attack campaign. In some embodiments, the phone answer system 230 may be integrated with or coupled to memory 122. In some embodiments, the memory may include any type and form of storage, such as a database or file system. The memory 122 may store data such as parameters and scripts corresponding to the choices made by a server 106 through a phone answering system 230, e.g. as described above for a particular simulated reverse vishing attack.

The simulated reverse vishing message received by the user may instruct the user to call a phone number. When the user calls the phone number, the user may be played a recorded message from recorded messages storage 232. In some embodiments, the security awareness system may store the messages to be played to the user when the user phones the call-to number as text messages, which may be stored in TTS messages storage 234. The text messages may be converted to audio messages to be played back to the user using a text to speech (TTS) engine 246. The text to speech engine 246 may be part of the security awareness system server 106, or the text to speech engine 246 may be a cloud-based TTS, such as Twilio (Twilio, San Francisco, Calif.). The cloud-based TTS may be accessed through a web service API.

The phone answering system 230 may include a reference ID identifier 236. The reference ID identifier 236 may be integrated with or coupled to the memory 122 so as to provide the reference ID identifier 236 access to reference IDs assigned to users for a particular simulated reverse vishing campaign by e.g. the server 106. The reference ID identifier 236 may be integrated with or coupled to memory or a memory store or otherwise a storage, such as a database, containing reference identifiers. The reference ID identifier 236 may be an application, service, daemon, routine, or other executable logic for recognizing reference identifiers and associating reference identifiers and/or phone numbers with a particular user. When the user phones the call-to number, the recorded or TTS message may ask the user to enter the reference ID that was provided to them in the simulated reverse vishing attack message. The reference ID identifier 236 may receive the reference ID that was input by the user. In some examples, the reference ID identifier 236 may query the reference ID manager 242 in order to determine which user the reference ID is associated with. In some examples, the reference ID identifier may query both the reference ID manager 242 and the phone number manager 244 in order to determine the user from the combination of the call-to phone number and the reference ID is associated with. The reference ID identifier 236 may alert the simulated phishing campaign manager 210 of the user ID once it determines the user identity, such that the simulated phishing campaign manager 210 knows that the user has failed the simulated reverse vishing attack. In some embodiments, the reference ID manager 242 may notify the group manager of the user identify of the user that failed the simulated reverse vishing attack.

The phone answer system 230 may include a call monitor 238. The call monitor 238 may be integrated with or coupled to the memory 122 so as to provide the call monitor 238 access to parameters associated with incoming call to a call-to number made by users for a particular simulated reverse vishing campaign by e.g. the server 106. The call monitor 238 may be integrated with or coupled to memory or a memory store or otherwise a storage, such as a database, containing recorded messages 232. The call monitor 230 may be an application, service, daemon, routine, or other executable logic for monitoring phone calls. The call monitor may monitor the call from the user that dials the call-to number provided in the simulated reverse vishing message. The call monitor 238 may track how long the user stays on the call once it is connected. The call monitor 238 may track whether the user inputs the reference ID once the call is connected. The call monitor 238 may track whether the user inputs the reference ID before, during, or after the recorded message is played to the user. In some examples, the call monitor 238 may keep track of whether the user stays connected to the call during any remedial training provided to the user on the call. The call monitor may record any additional input from the user on the call, for example the call monitor 238 may record any very input from the user, or any key strokes of the user that are not related to providing the reference ID. In some examples, once the user inputs their reference ID, the users will be played a recorded message from the recorded messages storage 232. The recorded message may instruct the user that no further action is needed. In some examples, the recorded message may instruct the user to enter some or all their credit card number or may instruct the user to enter some or all of their social security number. The phone answering system 230 may play a message informing the user that this was a simulated attack, and that they need to stay on the line for remedial training.

The server 106 may include phone-based training manager 222. Phone-based training manager 222 may process input from the server 106 and/or may provide access as needed to various applications, modules, and other software components of server 106 to other various applications, modules, and other software components of server 106. Phone-based training manager 222 may monitor and control remedial training provided via the phone when a user fails a reverse simulated vishing attack, may process requests for access to simulated attack campaign results, may provide access to recorded phone-based remedial training, and/or may perform other tasks related to the management of a simulated phishing attack campaign. In some embodiments, the phone-based training manager 222 may be integrated with or coupled to memory 122. In some embodiments, the memory may include any type and form of storage, such as a database or file system. The memory 122 may store data such as parameters and scripts corresponding to the choices made by a server 106 through a phone-based training manager 222, e.g. as described above for a particular simulated phishing attack.

When a user fails a simulated reverse phishing attack, for example by calling the phone number providing and entering in their reference ID, the system may provide remedial training on the phone. The system may connect the user through to recorded training messages, which may be stored in recorded training storage 224. The remedial phone-based training may be a short message which explains the user's failure. In some examples, the remedial phone-based training may be general training about security awareness. In some examples, the training completion monitor 226 monitors the phone call to track whether the user stays on the line until the completion of the remedial phone-based training. If the user does not disconnect the call before the completion of the remedial phone-based training, then the system tracks that the user completed the remedial phone-based training. In some examples, if the user disconnects the call before the completion of the remedial phone-based training, the system tracks that the user did not complete the remedial phone-based training and may enroll the user into a group to receive remedial training. To confirm that users have completed the phone-based remedial training, the system can track how long the user is on the phone. In some examples, the system may compare the length of the phone call from the user with the length of the provided phone-based remedial training. In some examples, the system may require that the user provide some input at the end of the phone-based remedial training to confirm that they have listened to it. The user may be required to press a specific key on their phone after the phone-based remedial training message has been completed to confirm that they have received the phone-based remedial training message.

In some examples, the user that did not complete the phone-based remedial training is assigned an attribute that can be used to identify the user as a user that failed a reverse vishing attack and did not complete the phone-based remedial training. This attribute can be used when forming query-based groups. In some embodiments, even if the user completes the phone-based remedial training, the user is identified for further remedial training. The phone answering system 230 may include a user flag manager 240 which can assign a flag to the user if the user hangs up before completing the phone-based remedial training. In some embodiments, if the user has been assigned this flag, then the system may enroll the user in a traditional phishing training campaign. In some examples, the user may show up in a system report as having failed a simulated attack and having not completed remedial training Users who complete the phone-based remedial training may be assigned a user flag to be enrolled in additional training at a later time.

In some examples, the user may be sent a link through a message directing the user to remedial training. The link may be sent immediately after the call ends or when the user hangs up. In some examples, the user may be prevented from access some functions on a user device unless or until the user completes one or more remedial training exercises. In some examples, the system may lock processes on the user's device and may generate a pop up which notifies the user that they need to complete remedial training. The remedial training may be part of the pop up that is displayed to the user on the user device. The pop up which may be displayed on the user device may include a link to a landing page where the user may access remedial training. In some examples, the training completion monitor 226 may track all the remedial training that is completed by the user, started and not completed by the user, and not started by the user.

When a user responds to a simulated reverse vishing attack message and calls in, the system needs to be able to identify the user regardless of the phone number that they call in from. In some embodiments, the user may be identified by the call-to phone number provided to the user in the simulated reverse vishing attack message. It may be advantageous to identify the user by the call-to number alone, because the system will be able to determine that the user has failed the simulated reverse vishing attack whether or not the user enters the reference ID provided in the simulated reverse vishing attack message. In circumstances where there are a large number of users, it would be necessary to have a large number of call-to phone numbers for the users to call into in order to uniquely identify them. This may be problematic, particularly where the call-to phone number needs to be from a specific geographic location due to the context of the reverse vishing message. The security awareness system needs to maintain all of the call-to numbers as valid phone numbers that may be able to accept a call, which can become very expensive if a large number of unique call-to numbers are required. In some embodiments, the call-to phone number is a 10-digit phone number. Call-to phone numbers may be "1-800" or toll-free numbers. Call-to phone numbers may be managed by a phone number manager 244. Call-to phone numbers may be chosen to coincide with a user's local calling area, and the system may maintain a pool of numbers for a variety of different local areas. The call-to phone numbers can vary from county to county or even city to city. In some embodiments, the phone number manager 244 has logic to identify the last time a phone number was used in a simulated reverse vishing attack message in order to avoid repetition in a given period of time.

In some embodiments, the user may be identified by the reference ID provided to the user in the simulated reverse vishing attack message. For example, more than one user may be provided with the same call-to phone number, and the system identifies the user that calls in by the reference ID that they input into the phone when their call is received. In some embodiments, reference IDs can be selected from a pool of reference IDs so as to identify some attribute of the user, for example the company that the user works for, the organizational department within the company that the user works for, or any other user attribute that the system may wish to track. In some embodiments, the reference ID may be instantaneously generated at the time that the simulated reverse vishing attack message is created for the user, and the reference ID manager 242 may track the relationship between reference ID and user for some time period. In some embodiments, the reference IDs are only considered valid for a certain period of time, after which the reference IDs are used for different users. If there are a significant number of users, the system may need to maintain a large number of unique reference IDs, which may extend the length of the reference ID (e.g. from 4 digits, to 5 digits, to 6 digits or greater).

In some examples, each user is uniquely identified by a combination of a call-to phone number that is provided in the reverse vishing message, and a reference ID. Creating a user identifier through associating the reference ID with the call-to phone number enables the use of fewer call-to phone numbers and shorter reference IDs while still maintaining a large number of unique user identifiers. As an example, users in Pinellas County may receive a simulated reverse vishing attack message telling them that they have unpaid parking tickets and that there's a judgement against them. The message may then instruct the user to call the Pinellas County Courthouse at a local phone number, and to provide a reference ID when they hear the recorded message in order to resolve the judgement. In this example, the user would be considered to have filed the simulated reverse vishing attack if they call the provided call-to phone number and enter the provided reference ID. The server may use the combination of the call-to phone number and the reference ID to identify the user and may additionally use the combination of the call-to phone number and the reference ID to recognize other information about the user, for example where they called from, who they work for, or other user attributes.

Each of the server 106, second chance manager 200, simulated phishing campaign manager 210, phone-based training manager 222, reference ID manager 242, phone number manager 244, phone answering system 230, group manager 220 and text to speech engine 246 may comprise a program, service, task, script, library, application or any type and form of executable instructions or code executable on one or more processors.

Any of the server 106, second chance manager 200, simulated phishing campaign manager 210, phone-based training manager 222, reference ID manager 242, phone number manager 244, phone answering system 230, group manager 220 and text to speech engine 246 may be combined into one or more modules, applications, programs, services, tasks, scripts, libraries, applications, or executable code.

The server 106 may be a part of a cluster of servers 106. In some embodiments, tasks performed by server 106 may be performed by a plurality of servers. These tasks may be allocated among the plurality of servers by an application, service, daemon, routine, or other executable logic for task allocation. The server 106 may include a processor and memory. Some or all of server 106 may be hosted on cloud 108, for example by Amazon Web Services (AWS).

Figure 2B:
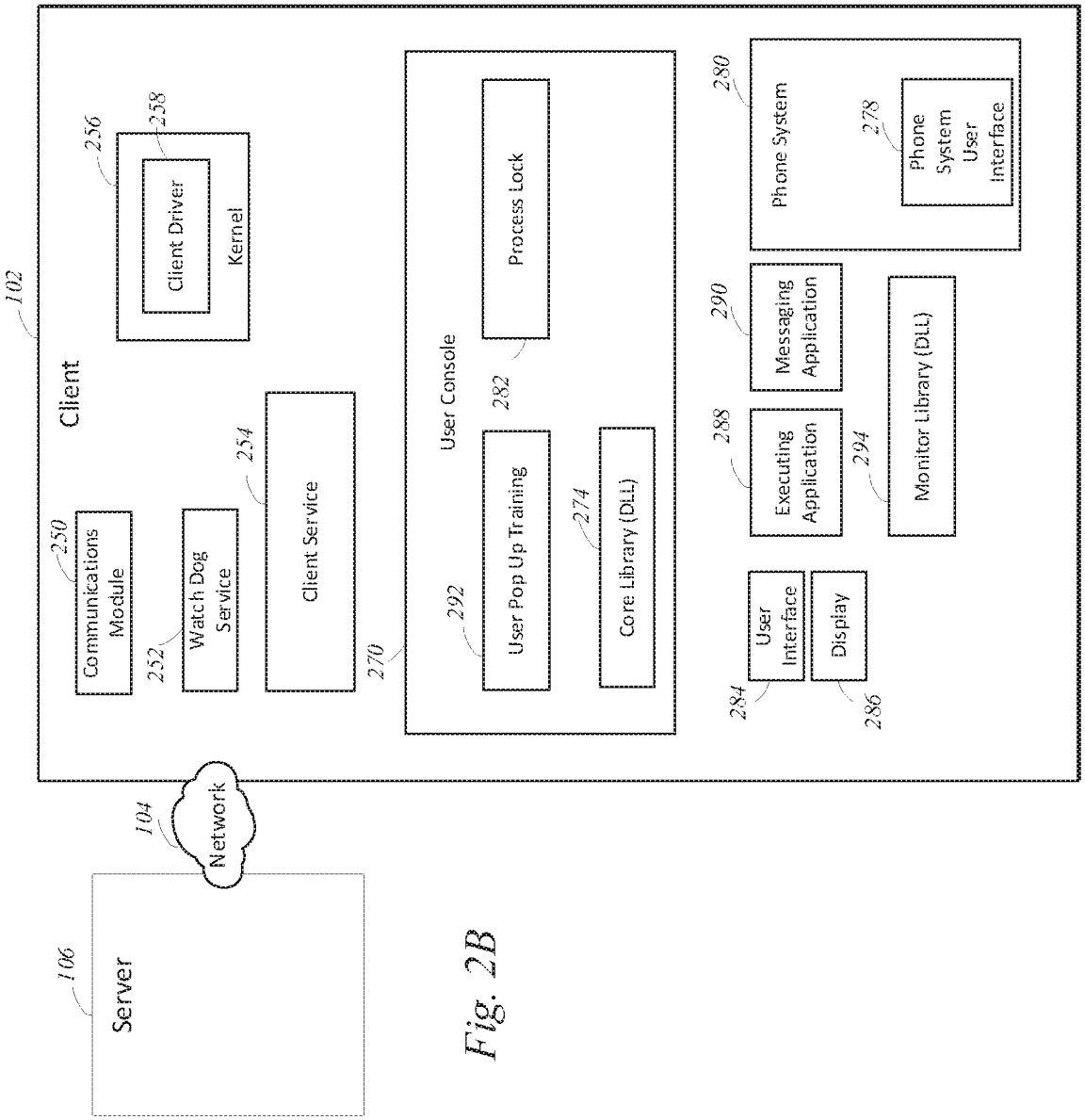
FIG. 2B depicts an implementation of some of the client architecture of an implementation of a system capable of performing simulated phishing attacks using reverse vishing techniques.

Referring to FIG. 2B, in a general overview, FIG. 2B depicts some of the client architecture of an implementation of a system capable of performing simulated phishing attacks using reverse vishing techniques. The system 200 also includes the client 102. The client 102 may include a communications module 250, a watch dog service 252, and a client service 254. The client 102 may include a kernel 256 which may include a client driver 258. The client may include user console 270, which may include a core library (DLL) 274, a process lock 282, and user pop up training 292. The client may include one or more executing applications 288 and one or more messaging applications 290 and may include a monitor library (DLL) 294. The client may include user interface 284 and display 286. Client 102 may include a phone system 280 which may include a phone system user interface 278.

Referring to FIG. 2B, in more detail, a client may be a target of any simulated phishing attack. For example, the client may be an employee, member, or independent contractor working for an organization that is performing a security checkup or conducts ongoing simulated phishing attacks to maintain security. The client 102 may be any device used by the client. The client does not need to own the device for it to be considered a client device 102. The client 102 may be any computing device, such as a desktop computer, a laptop, a mobile device, or any other computing device. In some embodiments, the client 102 may be a server or set of servers accessed by the client. For example, the client may be the employee or a member of an organization. The client may access a server that is e.g. owned or managed or otherwise associated with the organization. Such a server may be a client 102.

In some implementations, client 102 may include a communications module 250. This may be a library, application programming interface (API), a set of scripts, or any other code that may facilitate communications between the client 102 and any of the server 106, a third-party server, or any other server. In some embodiments, the communications module 250 determines when to transmit information from the client 102 to the external servers via a network 104. In some embodiments, the communications module 250 receives information from the server 106 via a network 104. In some embodiments, the information transmitted or received by the communications module 250 may correspond to a message, such as an email, generated or received by the messaging application 290.

The client 102 may include a client service 254. The client service 254 registers a client driver 258 into the operating system's kernel 256. The client driver 258 is designed to monitor the creation and termination of applications within the operating system. The client service 254 ensures that client driver 258 is installed properly into the operating system. Once the client driver 258 is registered, the client service 254 waits for other critical startup programs to start (like winlogon.exe or explorer.exe in Windows), and then it starts a user console 270. The client service 254 also restarts the user console 270 should it crash or be terminated forcefully. The client service 254 is not associated with the user but is running in the background on the client all the time when started by the watch dog service 252. The client service 254 interacts with the user console 270 which runs in the user space allowing the system to pop up messages that target the user with dialogs. If the user fails a simulated reverse vishing attack, the client service 254 may interact with the user console 270 to create a pop up for the user and to activate the process lock 282 such that the user cannot use any of the processes running on the client device. The client 102 may include user pop up training 292 which is provided via the user pop up created by the user console 270. The client service 254 also starts a user console 270 for every user that logs into a user profile. There may be several instances of the user console 270 for every logged in user. The client service 254 is a separate component that monitors and can in some instances control the user console 270 when initiated (e.g., initiate user pop up training 292, or temporarily pause execution of an application using the process lock 282, such as pausing execution of a web browser).

The user console 270 runs in the user space of the operating system. The user console raises prompts, get replies, and takes care of everything that needs to be done interactively with the user. The user console 270 is equipped with an internal library, the core library 274, which allows it to detect processes being created or terminated by the operating system. Whenever the OS creates a process, the user console detects it and may block the execution of the process using the process lock 282. The user console 270 can connect with the client service 254 for its settings.

In some examples, client 102 may include a watch dog service 252. The watch dog service 252 starts and monitors the client service 254. The watch dog service 252 is launched as a delayed service. Several minutes after all the services start, the delayed services start running. When the watch dog service 252 starts up, it checks to see if the client service 254 is running. If this service is not running, then the watch dog service 252 starts this service. In another aspect, if an end user has advanced privileges and tries to kill the client services 252, the watch dog service 254 will see that the service is not running, and it will start it up again. In this way, the watch dog service 254 is a failsafe to ensure that the client service 254 is always running. The watch dog service 252 can also stop the client service 254 or stop and restart the client service 254.

In some embodiments, the client 102 may include a user interface 284 such as a keyboard, a mouse, a touch screen, or other appropriate user interface. This may be a user interface that is e.g. connected directly to a client 102, such as, for example, a keyboard connected to a mobile device, or may be connected indirectly to a client 102, such as, for example, a user interface of a client device used to access a server client 102. The client may include a display 286, such as a screen, a monitor connected to the device in any manner, or any other appropriate display.

In an implementation, the client 102 may include a messaging application 290. Messaging application 290 may be any application capable of viewing, editing, and/or sending messages. For example, messaging application 290 may be an instance of an application that allows viewing of a desired message type, such as any web browser, a Gmail™ application (Google, Mountain View, Calif.), Microsoft Outlook™ (Microsoft, Mountain View, Calif.), WhatsApp™ (Facebook, Menlo Park, Calif.), a text messaging application, or any other appropriate application. In some embodiments, messaging application 290 can be configured to display simulated phishing attack emails. Furthermore, the messaging application 290 can be configured to allow the target to generate reply messages or forwarded messages in response to the messages displayed by messaging application 290.

The client 102 may include phone system 280. Phone system 280 may be part of the user client, e.g. may be a voice over IP phone system that runs on the user client 102. In some examples, phone system 280 is a separate system from the user client, for example a desktop phone that may be part of a land line phone system. In some examples, phone system 280 may be a mobile device useful for placing voice calls, such as a mobile phone or a mobile device running a voice over IP client. Phone system 280 may include a phone system user interface 278. Phone system user interface 278 allows a user to provide input via the phone system. In some examples, the user input may be via voice, for example the user speaking into the phone. In some examples, the user input via the phone system user interface 278 may be via a keyed entry, for example via a keypad on the device. In some examples, the user may use the phone system user interface 278 to enter into the phone system a reference ID provided to the user in a message received from the system 200.

The client 102 receives simulated reverse vishing messages sent by the server 106 based upon the campaign created and executed by the simulated phishing campaign manager 210. The client 102 is able to receive the simulated phishing messages via the messaging application 290, display the received messages for the user using the display 286, and is able to accept user interaction via the user interface 284 responsive to the displayed message. In some embodiments, the system 200 receives user responses via the phone system 280 responsive to the displayed message. In some embodiments, if the user responds to the simulated phishing message, for example via the phone system 280, the client traverses on the client device to a landing page selected for the phishing campaign. The client 102 may lock processes on the client device if the user responds to the simulated phishing message via phone system 280.

Each of the client 102, messaging application 290, executing application 288, client service 254, user console 270, phone system 280 and watch dog service 252 may comprise a program, service, task, script, library, application or any type and form of executable instructions or code executable on one or more processors. Any of the client 102, messaging application 290, executing application 288, client service 254, user console 270 and watch dog service 252 may be combined into one or more modules, applications, programs, services, tasks, scripts, libraries, applications, or executable code.

In some embodiments, the settings for a service that describes phone-based remedial training include a script string. In some examples, the script string may be stored in the TTS messages storage 234. In some embodiments, a text to speech engine 246 is used to convert the script string into an audio file according to the settings for the service. The script string may include the voice script to use for the remedial training in order to deliver the reverse simulated vishing attack to the user. In some embodiments, the settings for a service that describes phone-based remedial training includes a voice type to use to speak the script on a voice call. In some embodiments, the settings for a service that describes phone-based remedial training includes a language to use to speak the script on a voice call. In some embodiments, the settings for a service that describes phone-based remedial training includes a counter which indicates the number of times to repeat the VoIP call voice script.

In some embodiments, the settings for a service that describes phone-based remedial training includes a location of an audio file to be used for a VoIP call. In some embodiments, the audio file is stored in recorded message storage 232. In some embodiments, the audio file may be an MPEG-1 audio layer 3 (MP3) file, an MPEG-1 audio layer 4 (MP4) file, a pulse-code modulation (PCM) file, a waveform audio file format (WAV) file, an audio interchange file format (AIFF) file, an advanced audio coding (AAC) file, a windows media audio (WMA) file, a free lossless audio codec (FLAC) file, an Apple lossless audio codec (ALAC) file, a Window media audio (WMA) file, or any other audio file format.

In some embodiments, the settings for a service that describes the input for one or more SMS messages, text messages, emails messages for the reverse simulated vishing campaign includes a string. In some embodiments, the settings for a service that describes the input for phone-based remedial training includes a string. The string may identify, contain or provide the body of the message or the phone-based remedial training. In some embodiments, the string comprises an identifier to file that has the body of the message or the phone-based remedial training. In some embodiments, the string comprises an identifier or key to a record or data in a database that has the body of the message or the content for the phone-based remedial training. In some embodiments, the string indicates who or where the message or the phone-based training is from. In some embodiments, the string may indicate a reply to address for the message or a call back number for the phone-based remedial training.

In some embodiments, the service that receives voice calls is a cloud-based communications platform as a service that enables communications between mobile devices, applications, services, and systems, such as by providing a globally available cloud API. An example of a cloud communications platform as a service that can be used to VoIP call capability is Twilio of San Francisco, Calif. In some embodiments, system 200 passes to a cloud communications platform one or more of a "call to" phone number, a recipient, and a URL to an audio file to be played on the call.

In some embodiments, server 106 includes a storage for "call to" phone numbers 207. In some embodiments, the data structure of the "call to" phone number information in "call to" phone number storage 207 includes one or more of a phone number ID, an abbreviation for one of the state, the province, the region, the county, and the jurisdiction. In some embodiments, the data structure of the "call to" phone number information stored for "call to" phone number record in "call to" phone number storage 207 includes one or more of a city name that the phone number is associated with, a country code associated with the phone number, and an area code associated with the phone number. In some embodiments, the data structure of the "call to" phone number information stored for "call to" phone number record in "call to" phone number storage 207 includes a list of other phone number area codes in the same area as the phone number. In some embodiments, the data structure of the "call to" phone number information stored for "call to" phone number record in "call to" phone number storage 207 includes one or more of the digits of the phone number, and the time and date that the phone number was last used in a reverse simulated phishing campaign.

Figure 3:
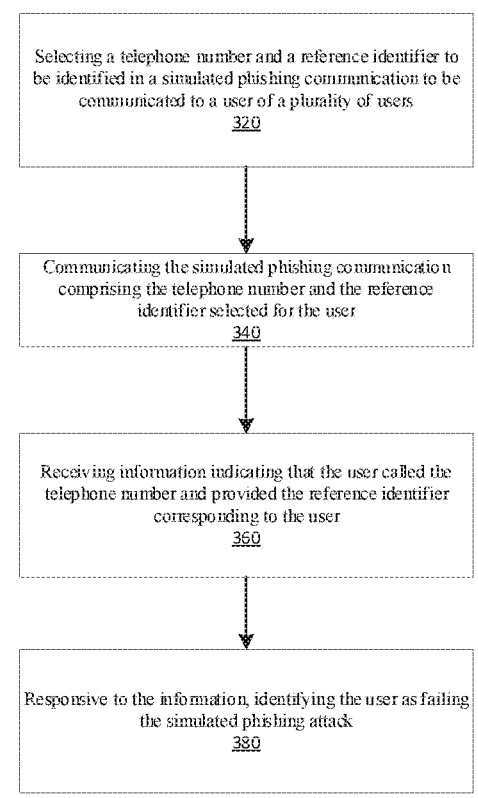
FIG. 3 depicts an implementation of a method for identifying a user that fails a simulated phishing attack using reverse vishing techniques as part of a security awareness system.

Referring to FIG. 3 in a general overview, FIG. 3 depicts an implementation of a method 300 for identifying a user that fails a simulated phishing attack using reverse vishing techniques as part of a security awareness system. In step 320, the method 300 may include selection a telephone number and reference identifier to be identified in a simulated phishing communication to be communicated to a user of a plurality of users. In some examples, the method 300 may include communicating the simulated phishing communication comprising the telephone number and the reference identifier selected for the user (step 340). Method 300 may include receiving information indicating that the user called the telephone number and provided the reference identifier corresponding to the user (step 360). In some embodiments, responsive to the information, the method 300 may include identifying the user as failing the simulated phishing attack (step 380).

Referring to FIG. 3 in more detail, FIG. 3 may include selecting a telephone number and a reference identifier to be identified in a simulated phishing communication to be communicated to a user of a plurality of users (step 320). In some examples, the simulated phishing campaign manager 210 may select a telephone number and reference identifier to be identified in a simulated phishing communication. The simulated phishing campaign manager 210 may select the telephone number to be identified in a simulated phishing communication to be communicated to the user based on the geographic location of the user. For example, if the user lives or works in a specific geographic location, the simulated phishing campaign manager 210 may select a telephone number from the same geographic location, such that the user is being asked to dial a local telephone number. In some embodiments, the telephone number selected may be a toll-free telephone number, such as a "1-800" telephone number. In some embodiments, the telephone number or the reference identifier may be unique amongst a group of users in a simulated phishing campaign. In some embodiments, the telephone number or the reference identifier may be unique amongst a group of users across more than one simulated phishing campaign. In some embodiments, the telephone number or the reference identifier may be unique for a period of time amongst a group of users, for example a telephone number or a reference identifier may be used only once in an hour, or once in a day, or once in a week. For example, users in Pinellas Country may receive an email telling them that they have unpaid parking tickets and that there is a judgement against them. The email may further instruct them to call the Pinellas County Courthouse at a provided phone number, which is a phone number that is local to Pinellas County, and to provide a reference ID to resolve the problem.

In some embodiments, the simulated phishing campaign manager may select the combination of the telephone number and the reference identifier to be unique amongst a group of users. For example, a group of users may use the same telephone number but have difference reference identifiers, making the combination of the telephone number and the reference identifier unique for each of the users.

In some examples, the method 300 may include communicating the simulated phishing communication comprising the telephone number and the reference identifier selected for the user (step 340). The simulated phishing campaign manager 210 may generate or modify content of the simulated phishing communication to the user to identify the telephone number and the reference identifier. For example, the simulated phishing campaign manager 210 may use a simulated phishing email template and may include in the email template the call to phone number that the user is asked to call, in addition to a reference identifier that the user is asked to provide. The simulated phishing communication may prompt the user to call the telephone number identified in the simulated phishing communication and to input into the phone the reference identifier selected for that user. In some examples, the simulated phishing campaign manager 210 may use an SMS or text message to communicate the telephone number and the reference identifier to the user, using content from a simulated phishing communication template for an SMS or text message, or generating the content for the SMS or text message to include the telephone number and the reference identifier. An example of a message generated is as follows: users will receive an email that is simulated to appear that it is from Amazon, and the message indicates that there is a problem with their order (for example the price has changed, or their payment information did not work) and asks the user to call in to resolve the problem. In the email, the simulated phishing campaign manager 210 may include four digits and indicate that these are the last four digits of the user's credit card that is on file and may provide a reference ID (the reference ID may or may not be related to the four digits provided in the message). The user may not recognize the last four digits as corresponding to their credit card, and so the user may wish to call the provided number. If the user calls the provided number, then the user has failed the simulated phishing attack.

Method 300 may include receiving information indicating that the user called the telephone number and provided the reference identifier corresponding to the user (step 360). In some embodiments, the server 106 may receive a telephone call from the user to the telephone number selected for, and sent to, the user. The server 106 may play a predetermined message instructing the user to enter the reference identifier that was selected for, and provided to, the user. In some examples, the server 106 may receive information comprising identification of the user and location from which the user called the telephone number. For example, the server 106 may identified the phone number the user called from using, for example, caller ID services. The server may confirm the identity of the user by identifying the called from number as one of the telephone numbers that is associated with the user in the security awareness system. In some examples the server 106 may use a telephone number look up service, for example a cloud-based service such as a reverse phone number look up service, to determine the user's identity. The simulated phishing campaign manager 210 may compare the user identity as known from the call-to phone number that the user's phone call was received on, or the reference ID that the user provided, or the combination of the call-to phone number and the reference ID, with the user identity as learned from the called-from number and the reverse phone number look up service, to insure that they know the identity of the user. In some embodiments, if the user calls from a phone number that is not currently associated with the user, and the simulated phishing campaign manager identifies the user using one or more of the call to phone number and the reference ID, the simulated phishing campaign manager 210 may create an association between the number that the user called from, and the user.

In some embodiments, responsive to the information, the method 300 may include identifying the user as failing the simulated phishing attack (step 380). In some embodiments, the simulated phishing campaign manager may receive information comprising identification of how long the user was on the phone when they called the provided phone number. The simulated phishing campaign manager may start a timer when the phone call is received from the user and may stop the timer when the user or the system disconnects the phone call. In some examples, the simulated phishing campaign manager 210 may determine whether the user completed remedial training provided via the telephone when the user calls the call to number. The simulated phishing campaign manager may use the identification of how long the user was on the phone to determine whether the user completed the phone-based remedial training. If the user does not stay on the phone long enough to complete the phone-based remedial training, the user flag manager 240 can flag the user, and based on that flag the simulated phishing campaign manager 210 can enroll the user in a traditional training campaign or can have the user show up in a report. Users who complete the phone remedial training may also be assigned a flag by the user flag manager 240 in order to enroll the user in additional training. To confirm that users have completed the phone-based training, training, the simulated phishing campaign manager may add a confirmation at the end of the training where the user acknowledges listening to the training by pressing one or more keys on their phone.

In some embodiments, remedial training is delivered as phone-based training at the time that the user calls the call-to number. Remedial training can also be delivered to the user by sending the user a new message with a link that takes them to the remedial training materials.

In some examples, smart group rules, queries or other automated processes can utilize the flags assigned to the users who failed the simulated reverse vishing attack. For example, all uses that are flagged for having failed a simulated reverse vishing attack may be put into a remedial training group and may receive an email notification indicating that they must complete a training campaign.

In some examples, the content of the simulated reverse vishing email can be tailored to the user through knowledge of the user's situation or location. Artificial intelligence and/or machine learning may be used to create content that is targeted towards a user or group of users. For example, the system may identify that user has traveled internationally based on their calendar, and the simulated phishing campaign manager 210 may then select an email and/or a recorded message having to do with customs or immigration, flights, lost baggage, and so on. In some embodiments, the simulated phishing campaign manager uses the situation or location information to select a predetermined set of templates that may be used, or may be modified to be used, for the simulated reverse vishing campaign. Pairing a predetermined template that is correlated to information about the user with a local phone number for the call-to number, makes the simulated attack more relevant to target users.

Figure 4:
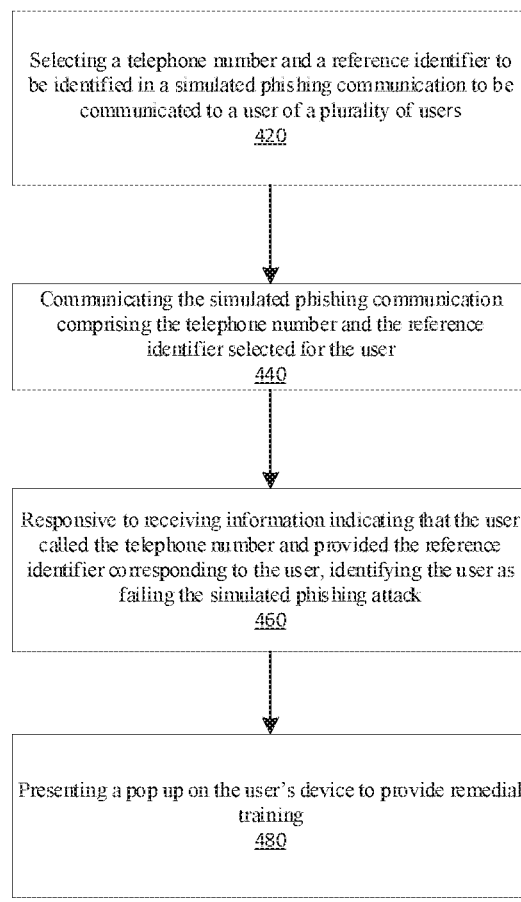
FIG. 4 depicts an implementation of a method for identifying a user that fails a simulated phishing attack using reverse vishing techniques as part of a security awareness system, and presenting a communication on the user's device to provide remedial training.
Figure 5:
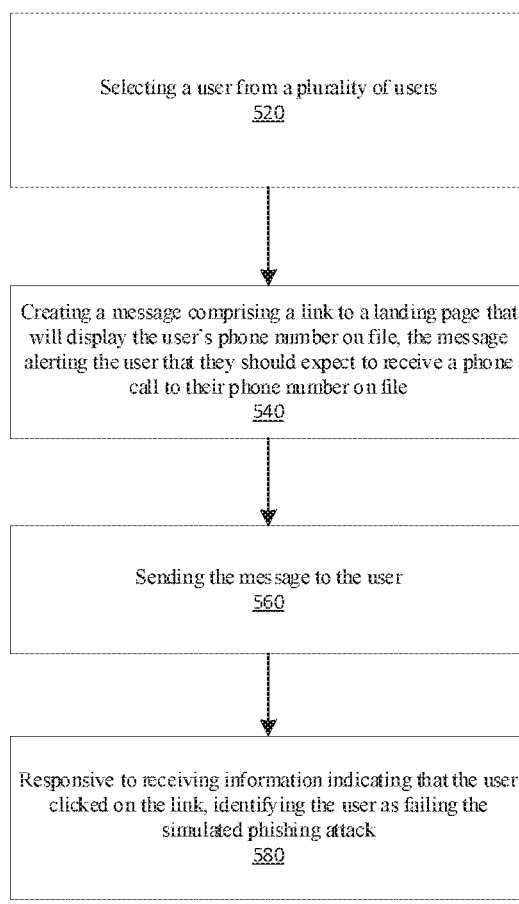
FIG. 5 depicts an implementation of a method for creating a message preparing a user to receive a phone call to a number on file for the user, and presenting a link for the user to click to verify their phone number.
Figure 6:
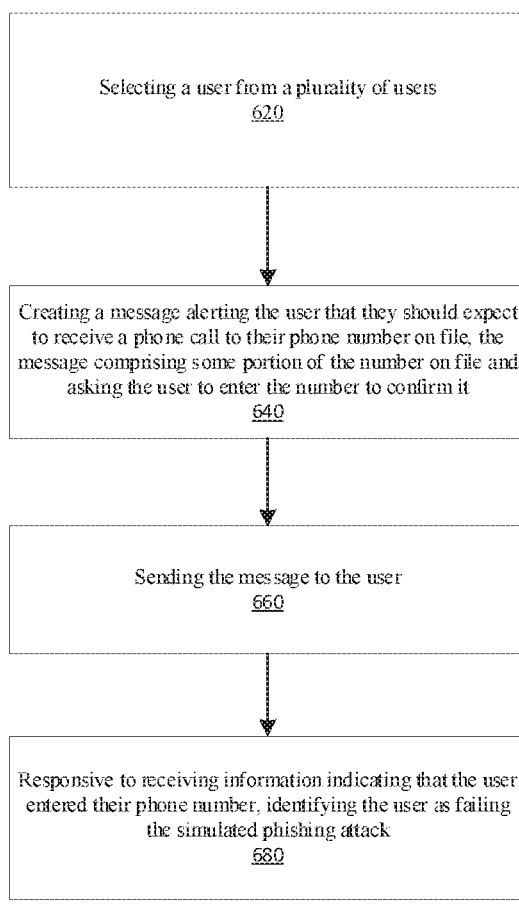
FIG. 6 depicts an implementation of a method for creating a message preparing a user to receive a phone call to a number on file for the user, presenting part of the user's phone number to the user, and asking the user to enter their entire phone number.

Referring to FIG. 4 in a general overview, FIG. 4 depicts an implementation of a method 400 for identifying a user that fails a simulated phishing attack using reverse vishing techniques as part of a security awareness system and presenting a communication on the user's device to provide remedial training. In some embodiments, in step 410 the simulated phishing campaign manager selects a user from a plurality of users. The method may include selecting a telephone number and a reference identifier to be identified in a simulated phishing communication to be communicated to a user of a plurality of users (step 420). The method may include creating a message comprising the telephone number and reference identifier selected for the user, a link to a landing page that will display the user's phone number on file, or a message comprising some portion of the number on file and asking the user to enter the number to confirm it (step 430). The method may include sending the message to the user (step 440). Responsive to receiving information indicating that he user called the telephone number and provided the reference identifier, clicked on the link in the message sent to the user, or entered their phone number, the method may include identifying the user as failing the simulated phishing attack (step 450). The method may also include presenting a pop up on the user's device to provide remedial training (step 460).

Referring to FIG. 4 in more detail, the method of FIG. 4 may include selecting a user from a plurality of users (step 410). The user may be selected from a group of users that share a specific user characteristic. In one embodiment, the user may be selected from a group of users who have not received training for vishing. The user may be identified through integration of the company's active directory. The user may be selected based on a time-based determination. For example, the user may be selected because they are approaching a work date anniversary, or because their annual performance review is due. A user may be selected based on a risk profile for the user. For example, the user may be selected because users that share similar characteristics to the user have been historically more prone to cyber security attacks such as phishing and vishing attacks.

The method of FIG. 4 may include selecting a telephone number and a reference identifier to be identified in a simulated phishing communication to be communicated to a user of a plurality of users (step 420). In some examples, the telephone number is selected to be a unique telephone number. The telephone number may be selected from any one or a number of sources, for example from an LDAP, calendar or responsive to initiating a campaign. The system may use the selected telephone number to identify the user. In some examples, the telephone number may be selected such that the telephone number is a local telephone number for the user. For example, the telephone number may have an area code corresponding to the user's home or work location. The telephone number may have an area code corresponding to the geographic location where the user is currently at. In some examples, the telephone number may be a toll-free number. The telephone number may have an area code that corresponds to the geographic location indicated in a simulated communication sent to the user. For example, if the simulated communication sent to the user purports to be from a police department, the telephone number may be selected to be in the same area code as would be used for the location of the police department.

The system may select a reference identifier that the user may be asked to input into the phone when they call the telephone number provided. In some embodiments, the reference identifier is unique amongst all users in the system. The reference identifier may be unique amongst all users of the same company. In some examples, the reference identifier and/or the phone number and/or the combination of the reference identifier and the phone number is unique amongst all users, or amongst all users in a given group, for example amongst all users in a company. In some examples, the reference identifier and/or the phone number and/or the combination of the reference identifier and the phone number is unique in a given window of time, for example for an hour, a day, a week, or a month.

The method of FIG. 4 may include creating a message comprising the telephone number and reference identifier selected for the user (step 430). In some examples, the reference identifier may be provided to the user in a different message than the telephone number. The different messages may be on different communication channels, for example the user pay be provided the telephone number in an email, and the reference identifier in a text message. The message may be based upon a message template, such as a message template that is based upon a theme, for example an appointment reminder. The message created for the user may include information about why the user needs to call the telephone number in the message. For example, the message may inform the user that an order that they placed is on hold, and that they need to telephone the number to verify their personal information. The message may inform the user that a service that they subscribe to has been suspended and giving them a telephone number and a "case number", which is the reference identifier. The message created for the user may have a theme which corresponds to the company that the message is purporting to be from. The system administrator may create the message format and theme, in some examples incorporating company colors or branding that will make the message appear more genuine.

In some embodiments, the method of FIG. 4 may include creating a message comprising a link to a landing page that will display the user's phone number on file, or a portion of the user's phone number on file and requesting that the user to enter the number to confirm it (step 430). In some embodiments, the user may be asked to click on a link to be redirected to the landing page. The user's phone number may be displayed in the message with the link to the landing page. The message may request that the user confirm their telephone number by entering the number again on the associated landing page. The message may indicate that the system will call the user at the user's displayed phone number when the user clicks a button. In some examples, the user may be asked to click a button in the message itself to confirm that the displayed phone number is their phone number. The landing page may prompt the user to enter the last several digits of their phone number to confirm that the displayed phone number is their phone number. In some examples, users will receive an email alerting them that they should expect to receive a phone call to their phone number on file related to something relevant such as taxes after the IRS deadline. A reference ID may be included as well as a link to a landing page that will display the user's phone number on file. Once the user clicks the link to the landing page, the user has failed the simulated attack and the system captures this initial failure. If the user answers the call from the system and provides the reference ID, the system may consider this a more egregious failure.

In some embodiments, the method of FIG. 4 may include sending the message to the user (step 440). The message may be sent to the user via any of the user's communication devices. For example, the message may be sent to the user's email account. The message may be sent to the user as a pop up on the user's work computer. The message may be sent to the user as a text message to a business or personal mobile phone. The message may be sent to the user over an instant message channel. The message may be delivered to the user over any channel and in any way by which messages may be sent to a user.

In some embodiments, the method of FIG. 4 may include identifying the user as failing the simulated phishing attack responsive to receiving information indicating that the user called the telephone number and provided the reference identifier (step 450). In some examples, where the message provides a telephone number for the user, the user is identified as having failed the simulated phishing attack at the point where the system receives information that the user has dialed the provided telephone number and the call has been connected. In some embodiments, the user is identified as having failed the simulated phishing attack at the point where the system receives information that the user has dialed the telephone number and been connected and enters one or more digits of the reference identifier.

In some embodiments, the method of FIG. 4 may include identifying the user as failing the simulated phishing attack responsive to receiving information indicating that the user clicked on the link to the landing page in the received message (step 450). In some embodiments, the user may be identified as failing the simulated phishing attack responsive to the user validating their phone number on the landing page after being traversed to the landing page from the received message. In some examples, the user may be identified as failing the simulated phishing attack responsive to entering a reference identifier on the landing page traversed to from the received message. The user may be identified as failing the simulated phishing attack upon any interaction with the simulated phishing message or the landing page traversed to from the received simulated phishing message.

In some embodiments, the method of FIG. 4 may include identifying the user as failing the simulated phishing attack responsive to receiving information indicating that the user confirmed their phone number on the landing page that was traversed to when the user clicked on the link in the received message (step 450). In some embodiments, the user may confirm their phone number by a user interaction on the landing page, such as clicking a button, checking a box, hitting okay, etc. In some embodiments, the user may confirm their phone number on the landing page by entering one or more digits of their phone number. In some examples, the user may have to enter their entire phone number on the landing page. In some examples, the user may have to enter the last several digits of their telephone number, for example the last 4 digits of their telephone number.

Remedial training can be delivered to the user by sending the user a new message with a link that takes them to the remedial training materials. The client service 254 may create a pop up on a user device using the user console 270. In some examples the user console 270 generates the pop up immediately after the user fails the simulated reverse vishing attack. In some examples, the user console 270 generates the pop up after the user failed the simulated reverse vishing attack and when the user first tries to access their device. In some examples, the system may lock processes on the user's device and may generate a pop up which notifies the user that they need to complete remedial training. The remedial training may be part of the pop up that is displayed to the user on the user device. The pop up which may be displayed on the user device may include a link to a landing page where the user may access remedial training. In some examples, the training completion monitor 226 may track all the remedial training that is completed by the user, started and not completed by the user, and not started by the user.

The client service 254 interacts with the user console 270 which runs in the user space allowing the system to pop up messages that target the user with dialogs. If the user fails a simulated reverse vishing attack, the client service 254 may interact with the user console 270 to create a pop up for the user and to activate the process lock 282 such that the user cannot use any of the processes running on the client device. The client 102 may include user pop up training 292 which is provided via the user pop up created by the user console 270. The client service 254 also starts a user console 270 for every user that logs into a user profile. There may be several instances of the user console 270 for every logged in user. The client service 254 monitors and can in some instances control the user console 270 when initiated (e.g., initiate user pop up training 292, or temporarily pause execution of an application using the process lock 282, such as pausing execution of a web browser).

The systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMS, RAMS, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method comprising:
    communicating, by one or more processors, to a user a simulated phishing communication that includes a telephone number and a reference identifier;
    determining, by the one or more processors, that the user is to be trained responsive to receiving data indicating that the user called the telephone number and referenced the reference identifier of the simulated phishing communication; and
    initiating, by the one or more processors responsive to the determination, training to the user.

2. The method of claim 1, further comprising selecting, by the one or more processors, the telephone number for the user based at least on geographic information associated with the user.

3. The method of claim 1, wherein the reference identifier is valid for the user for a time period.

4. The method of claim 1, wherein a combination of the telephone number and the reference identifier is unique to the user among a plurality of users.

5. The method of claim 1, further comprising receiving, by the one or more processors, data indicating that the user called the telephone number and referenced the reference identifier of the simulated phishing communication telephone number and provided the reference identifier corresponding to the one or more users.

6. The method of claim 1, further comprising identifying, by the one or more processors, the user from the telephone number and reference identifier of the data.

7. The method of claim 1, further comprising providing, by the one or more processors, the training comprising phone-based remedial training.

8. The method of claim 7, further comprising providing the phone-based remedial training when the user calls the telephone number.

9. The method of claim 1, further comprising providing, by the one or more processors, the training by communicating a message to a device of the user with a link to training materials.

10. The method of claim 1, further comprising providing, by the one or more processors, the training by causing a pop up on a user interface of a device of a client with a link to training materials.

11. A system comprising:
    one or more processors, coupled to memory, and configured to:
    communicate to a user a simulated phishing communication that includes a telephone number and a reference identifier;
    determine that the user is to be trained responsive to receiving data indicating that the user called the telephone number and referenced the reference identifier of the simulated phishing communication; and
    initiate, responsive to the determination, training to the user.

12. The system of claim 11, wherein the one or more processors are further configured to select the telephone number for the user based at least on geographic information associated with the user.

13. The system of claim 11, wherein the reference identifier is valid for the user for a time period.

14. The system of claim 11, wherein a combination of the telephone number and the reference identifier is unique to the user among a plurality of users.

15. The system of claim 11, wherein the one or more processors are further configured to receive data indicating that the user called the telephone number and referenced the reference identifier of the simulated phishing communication telephone number and provided the reference identifier corresponding to the one or more users.

16. The system of claim 11, wherein the one or more processors are further configured to identify the user from the telephone number and reference identifier of the data.

17. The system of claim 11, wherein the one or more processors are further configured to provide training comprising phone-based remedial training.

18. The system of claim 17, further comprising providing the phone-based remedial training when the user calls the telephone number.

19. The system of claim 11, wherein the one or more processors are further configured to provide the training by communicating a message to a device of the user with a link to training materials.

20. The system of claim 11, wherein the one or more processors are further configured to provide the training by causing a pop up on a user interface of a device of a client with a link to training materials.

* * * * *